United States Patent [19]

Rayburn

[11] Patent Number: 5,055,965
[45] Date of Patent: Oct. 8, 1991

[54] METHOD AND APPARATUS FOR MAKING CAPACITIVE STRUCTURE AND LAMINATE USEFUL IN MAKING SAME

[75] Inventor: Charles C. Rayburn, Forest, Va.

[73] Assignee: Illinois Tool Works Inc., Glenview, Ill.

[21] Appl. No.: 633,946

[22] Filed: Dec. 26, 1990

[51] Int. Cl.$^5$ .................. H01G 4/08; H01G 4/30; H01G 1/14

[52] U.S. Cl. ............................ 361/303; 29/25.42; 361/323

[58] Field of Search ............... 29/25.42; 361/303, 304, 361/305, 308, 309, 310, 323

[56] References Cited

U.S. PATENT DOCUMENTS

| | | | |
|---|---|---|---|
| 2,565,301 | 8/1951 | Foster et al. | 29/25.42 |
| 2,627,645 | 2/1953 | Harris | 29/25.42 |
| 3,071,842 | 1/1963 | Helda et al. | 29/25.42 |
| 4,462,062 | 7/1984 | Rayburn | 361/323 |
| 4,531,268 | 7/1985 | Rayburn | 29/25.42 |
| 4,533,813 | 8/1985 | Rayburn | 219/121 LH |
| 4,756,064 | 7/1988 | Yoshii et al. | 29/25.42 |
| 4,849,853 | 7/1989 | Rayburn | 361/309 |
| 4,942,610 | 7/1990 | Rayburn | 361/309 |
| 4,985,512 | 1/1991 | Iizuka et al. | 525/537 |

OTHER PUBLICATIONS

Miniature Capacitors, published by ITW Paktron of Lynchburg, Virginia in 1989.

*Primary Examiner*—Donald A. Griffin
*Attorney, Agent, or Firm*—Dressler, Goldsmith, Shore, Sutker & Milnamow, Ltd.

[57] ABSTRACT

Method for making a capacitive structure. In a first mode, one coil of the interleaved webs is made from a laminate comprising a carrier tape, and two metallized, dielectric films, which may be ultra thin. One such web is wound into a coil. The other web and the carrier tape are twisted, by one half-turn, and wound over such one web and the carrier tape is peeled away so that the webs are interleaved. In a second mode, two coils of the interleaved webs are made from two laminates, each as described. One such web from one such laminate and one such web from the other laminate are wound into each coil so that the webs are interleaved. Techniques for providing each web with demetallized lanes and for slitting the webs into ribbons are disclosed. The carrier tape can be optionally omitted in some instances.

58 Claims, 4 Drawing Sheets

U.S. Patent  Oct. 8, 1991  Sheet 1 of 4  5,055,965
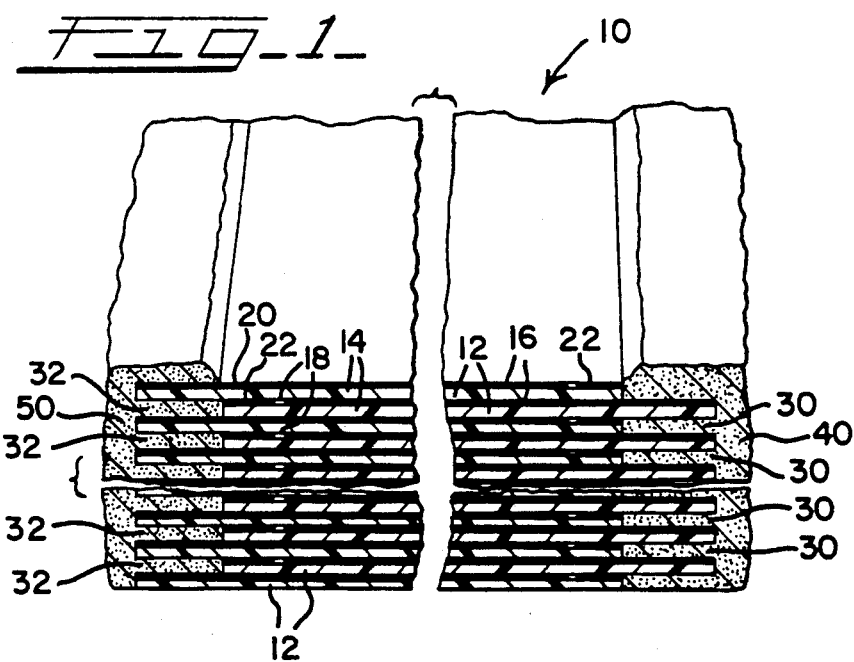
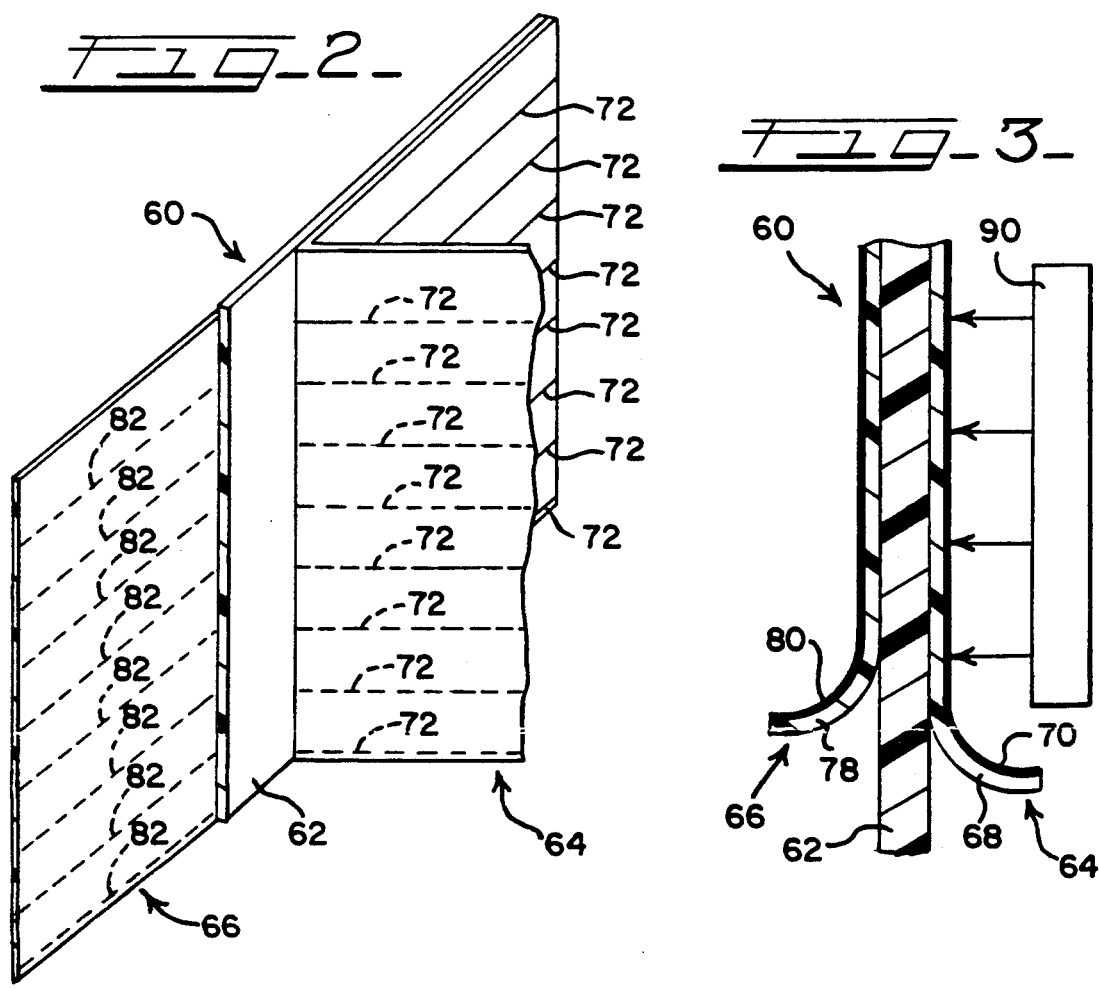

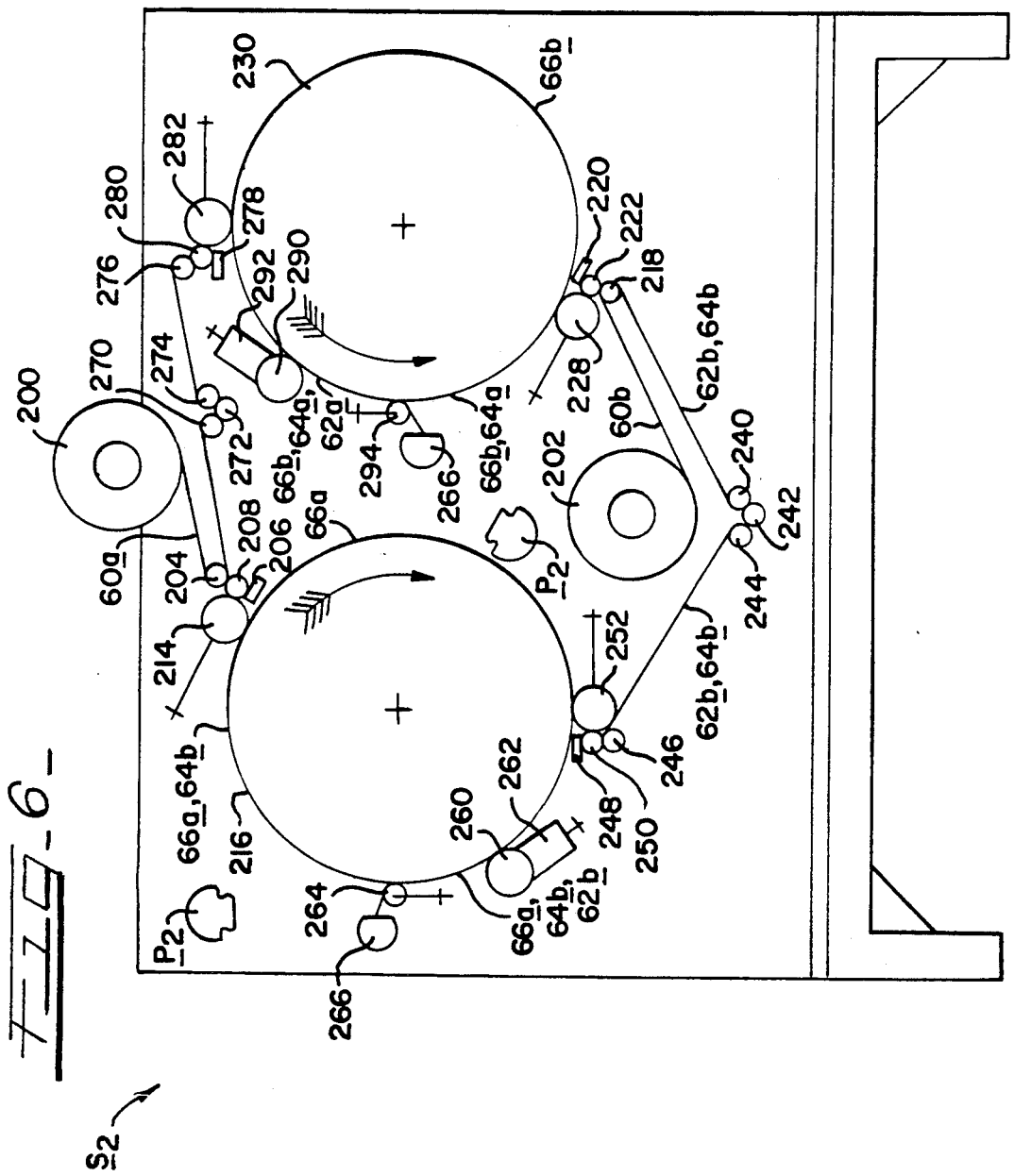

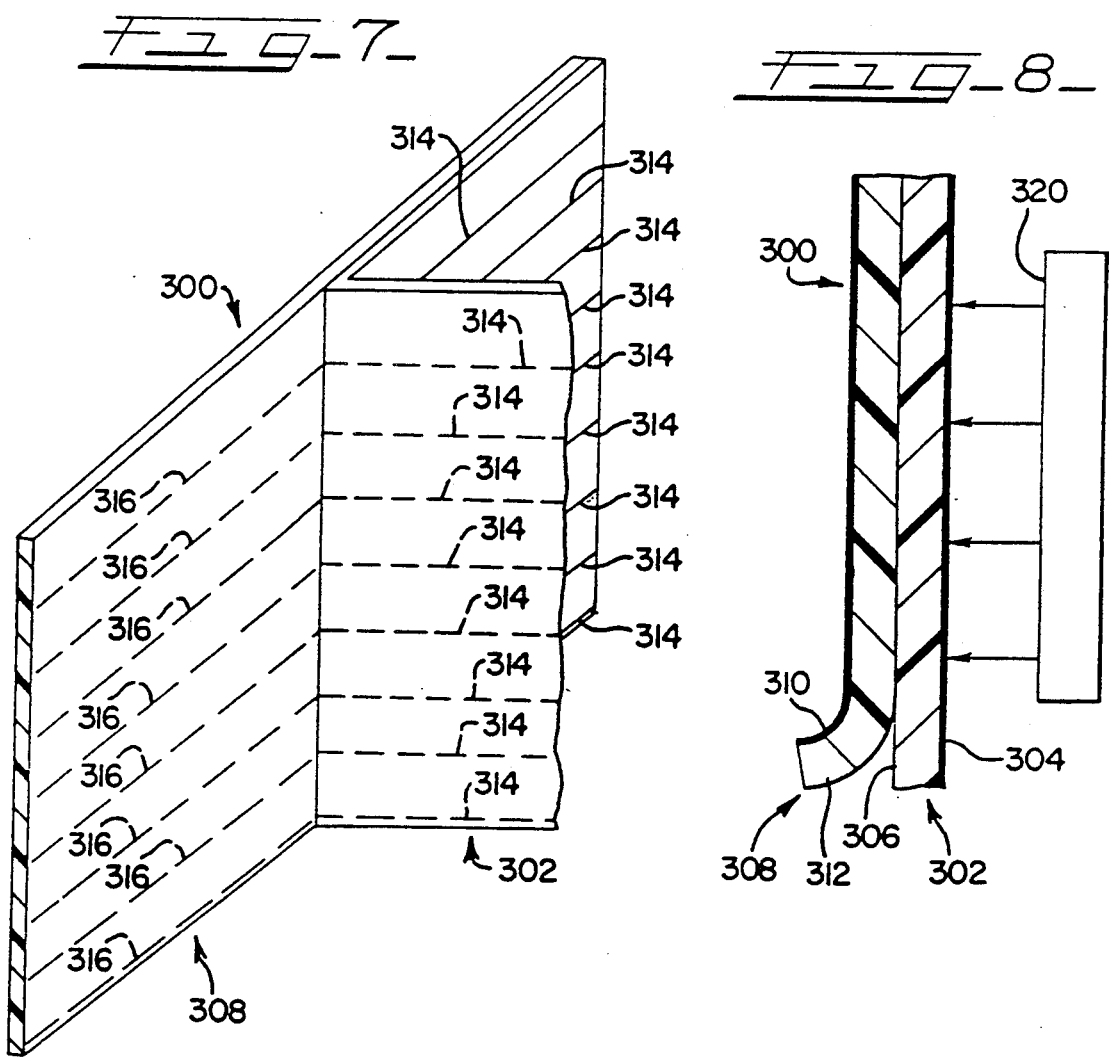

METHOD AND APPARATUS FOR MAKING CAPACITIVE STRUCTURE AND LAMINATE USEFUL IN MAKING SAME

TECHNICAL FIELD OF THE INVENTION

This invention pertains to an improved method for making capacitive structures of a type comprising interleaved webs of metallized, dielectric film, among other elements, wherein each web has a metallized layer and an opposite, dielectric layer. This invention pertains also to an improved apparatus for making such structures. The improved method and the improved apparatus have particular utility if the dielectric layer of each web is ultra thin. This invention pertains further to a novel laminate useful in making such structures

BACKGROUND OF THE INVENTION

Capacitive structures of the type noted above and methods for their manufacture are exemplified in Rayburn U.S. Pat. No. 4,462,062, Rayburn U.S. Pat. No. 4,531,268, Rayburn et al. U.S. Pat. No. 4,533,813,and Rayburn U.S. Pat. No. 4,849,853. As exemplified therein, the metallized layer of each web has narrow, longitudinal, laser-scribed, demetallized lanes. Miniature capacitors made from capacitive structures of the aforenoted type are available commercially from ITW-Paktron (a unit of Illinois Tool Works Inc.) of Lynchburg, Virginia, under its ANGSTOR trademark.

Typically, capacitive structures of the type noted above comprise interleaved webs of relatively thick, metallized, dielectric film, such as poly(ethylene terephthalate) film, which can be ordinarily handled in manufacturing methods exemplified in the aforenoted patents without undue risk of damaging such film Recently, it has been suggested that capacitive structures of the aforenoted type may be made from interleaved webs of metallized, ultra thin, poly(ethylene terephthalate) film. Ultra thin film presents serious problems in manufacturing capacitive structures, since it tends to be easily damaged.

Yoshii et al. U.S. Pat. No. 4,756,064 discloses a manufacturing method employing metallized, ultra thin, poly(ethylene terephthalate) film having a thickness of from about 0.2 $\mu$m to about 2.0 $\mu$m to make a capacitive structure. Such film is provided in a laminated structure, in which one layer of the metallized film adheres separably to a thicker, propylene copolymer, support film. Separate coils of the laminated structure are unwound from two unwinders. The laminated structure unwound from each unwinder is passed to a pair of nip rollers where the laminated structure is separated into the metallized film and the support film. The metallized films are superposed and are wound into a coil. The support films are rewound by two winders.

The Yoshii et al. patent refers to a five-layer structure including two ultra thin, metal-deposited films (see column 4, lines 42 through 51) and indicates that a capacitor element can be fabricated only by coiling the two films. Such patent, however, does not disclose any details of fabricating a capacitor element from the two films.

There has been a need, to which this invention is addressed, for new manufacturing methods employing metallized, dielectric film, particularly but not exclusively ultra thin, metallized, poly(ethylene terephthalate) film, for making capacitive structures of the type noted above.

SUMMARY OF THE INVENTION

This invention provides a method and an apparatus for making capacitive structures from interleaved webs of metallized, dielectric film, which may be ultra thin, poly(ethylene terephthalate) or PET film, wherein each web has a metallized layer and an opposite, dielectric layer. Alternately, such film may be poly(phenylene sulfide) or PPS film or may be poly(ethylene naphthalate) or PEN film.

Preferably, the dielectric layer of each web is a relatively thin layer of poly(ethylene terephthalate) film and a carrier tape is used, which may be a relatively thick layer of poly(ethylene terephthalate) film. Alternately, the carrier tape may be a relatively thick layer of any other polymeric film having suitable properties, such as a propylene copolymer film disclosed in Yoshii et al. U.S. Pat. No. 4,756,064. Preferably, moreover, the first web adheres peelably to the carrier tape at the dielectric layer of the first web and the second web adheres peelably to the carrier tape at the dielectric layer of the second web.

A carrier tape facilitates handling of two relatively thin webs of dielectric film, such as the ultra thin film disclosed in the Yoshii et al. patent, in the improved method of this invention. However, the carrier tape can be optionally omitted if a laminate is used that is comprised of two relatively thick webs of metallized, dielectric film, such as PET, PPS, or PPN film having a thickness in a range from about 0.5 $\mu$m to about 8.0 $\mu$m. Such relatively thick webs of metallized PET, PPS, or PPN film tend to be self-supporting and have sufficient tear resistance to permit their use without a carrier tape in the improved method of this invention.

In a first mode for carrying out this invention, one coil of the interleaved webs is made from a laminate of indeterminate length. The laminate comprises a carrier tape with two opposite surfaces, a first web of the metallized film adhering peelably to the carrier tape, and a second web of the metallized film adhering peelably to the carrier tape. The webs adhere respectively to the opposite surfaces of the carrier tape.

In a second mode for carrying out this invention, two coils of the interleaved webs are made from two laminates of indeterminate lengths. Each of the laminates is similar to the laminate employed in the first mode.

In the first mode for carrying out this invention, which one coil of the interleaved webs is made. The second web is peeled from the carrier tape and is wound into a coil in such manner that the metallized layer of the second web faces in a given radial direction. The carrier tape and the first web adhering peelably to the carrier tape are twisted, by one half-twist, after the second web has been peeled from the carrier tape. The first web is wound onto the second web, along with the carrier tape having the first web adhering peelably thereto, in such manner that the metallized layer of the first web faces in the same radial direction. The carrier tape is peeled from the first web. Thus, as the webs are wound into the coil, the webs are interleaved to form the capacitive structure.

Preferably, in the first mode, the second web is slitted into a selected number of first ribbons before the second web is wound into the coil and the first web is slitted into the selected number of second ribbons before the first web is wound onto the second web. Thus, the coil is divided into the selected number of coil segments, in each of which one of the first ribbons and one of the second ribbons are interleaved.

Moreover, the first mode may comprise removal of selected portions of the metallized layers of the webs, before either web is peeled from the carrier tape, in such manner that each web has the selected number of narrow, longitudinal, demetallized lanes, which are arranged in such manner that each ribbon has one of the demetallized lanes dividing the metallized layer of such ribbon into a major portion and a minor portion.

The webs having the demetallized lanes may be wound into the coil in such manner that the first ribbons are offset axially from the second ribbons. Thus, the major portion of the metallized layer of each second ribbon overlies the major portion of the metallized layer of one of the first ribbons.

Removal of selected portions of the metallized layers of the webs can be effected by applying optical energy from a laser to the metallized layer of a selected one of the webs along longitudinal lanes, in such manner that optical energy in beams from the laser removes selected portions of the metallized layer of the selected web, passes through the selected web, through the carrier tape, and through the remaining web, to the metallized layer of the remaining web, and vaporizes selected portions of the metallized layer of the remaining web.

Desirably, the first web may be heat-tacked to the second web after the first web is wound onto the second web, in each turn of the coil. Also, if the dielectric layer of the first web adheres peelably to the carrier tape, the first web may be heat-tacked to the second web, through the carrier tape, before the carrier tape is peeled from the first tape.

As mentioned above, the carrier tape can be optionally omitted in some instances. If the carrier tape is omitted, the first mode for carrying out this invention is simplified accordingly.

In the second mode for carrying out this invention, two coils of the interleaved webs are made, namely a first coil and a second coil. The second web of a first laminate is peeled from the carrier tape thereof and the second web of a second laminate is peeled from its carrier tape.

In forming the first coil, the second web from the first laminate and the first web from the second laminate, along with the carrier tape having the first web from the second laminate adhering peelably thereto, are wound into the first coil and the carrier tape is peeled from the first web from the second laminate, in such manner that the first web from the second laminate is wound onto the second web from the first laminate. Thus, the metallized layers of the webs wound into the first coil face in a common radial direction. Also, the webs wound into the first coil are interleaved to form the first coil.

In forming the second coil, the second web from the second laminate and the first web from the first laminate, along with the carrier tape having the first web from the first laminate adhering peelably thereto, are wound into the second coil and the carrier tape is peeled from the first web from the first laminate, in such manner that the first web from the first laminate is wound onto the second web from the second laminate. Thus, the metallized layers of the webs wound into the second coil face in a common radial direction. Also, the webs wound into the second coil are interleaved to form the second coil.

Preferably, in the second mode, each of the first webs is slitted into a selected number of first ribbons before the first webs are wound into the respective coils and each of the second webs is slitted into the selected number of second ribbons before the second webs are wound into the respective coils.

Moreover, the second mode may comprise removal of selected portions of the metallized layers of the webs of each laminate, before either web is peeled from the carrier tape of either laminate, in such manner that each web from each laminate has the selected number of narrow, longitudinal, demetallized lanes, which are arranged in such manner that each ribbon from each web from each of the laminates has one of the demetallized lanes dividing the metallized layer of such ribbon into a major portion and a minor portion.

Furthermore, removal of selected portions of the metallized layer of each web in the second mode may be effected by applying optical energy in a manner discussed above in a context of the first mode.

As each coil is made in the second mode, heattacking of the first web of such coil to the second web of such coil may be effected, possibly through the carrier tape having the first web of such coil adhering peelably thereto, in a manner discussed above in a context of the first mode.

As mentioned above, the carrier tape can be optionally omitted in some instances. If the tape is omitted, the second mode for carrying out this invention is simplified accordingly.

The improved apparatus provided by this invention comprises various mechanisms for providing the various functions noted above. Such apparatus is provided in two preferred embodiments, each corresponding functionally to one of the preferred modes noted above.

These and other objects, features, and advantages of this invention are evident from the following description of two preferred systems for carrying out this invention, with reference to the accompanying drawings.

BRIEF DESCRIPTION OF THE DRAWINGS

FIG. 1 is a greatly enlarged, fragmentary, cross-sectional view of a capacitive structure made by either of two disclosed modes for carrying out this invention.

FIG. 2, on a smaller scale compared to FIG. 1, is a fragmentary, perspective view of a representative laminate employed by this invention. The laminate, as shown, has a relatively thick, dielectric, carrier tape and two webs of relatively thin, metallized, dielectric film, each having laser-scribed, demetallized lanes. One of the webs is shown as being peeled from the carrier tape.

FIG. 3, on an larger scale compared to FIGS. 1 and 2, is a cross-sectional view of such a laminate before optical energy from a laser is applied, as and where indicated by arrows, so as to provide the demetallized lanes. The webs are shown as being peeled from the carrier tape.

FIG. 6, on a similar scale compared to FIG. 4, is a diagrammatic view of a preferred system for making a capacitive structure by a second mode for carrying out this invention.

FIG. 7, which is analogous to FIG. 2, is a fragmentary, perspective view of an alternative laminate employed by this invention. The laminate, as shown, has two webs of relatively thick, metallized, dielectric film without a carrier tape therebetween. One of the webs is shown as being peeled from the other web.

FIG. 8, which is analogous to FIG. 3, is a cross-sectional view of such a laminate without a carrier tape before optical energy is applied, as and where indicated by arrows, so as to provide the demetallized lanes. One of the webs is shown as being peeled from the other web.

DETAILED DESCRIPTION OF DISCLOSED MODES

Figure 5:
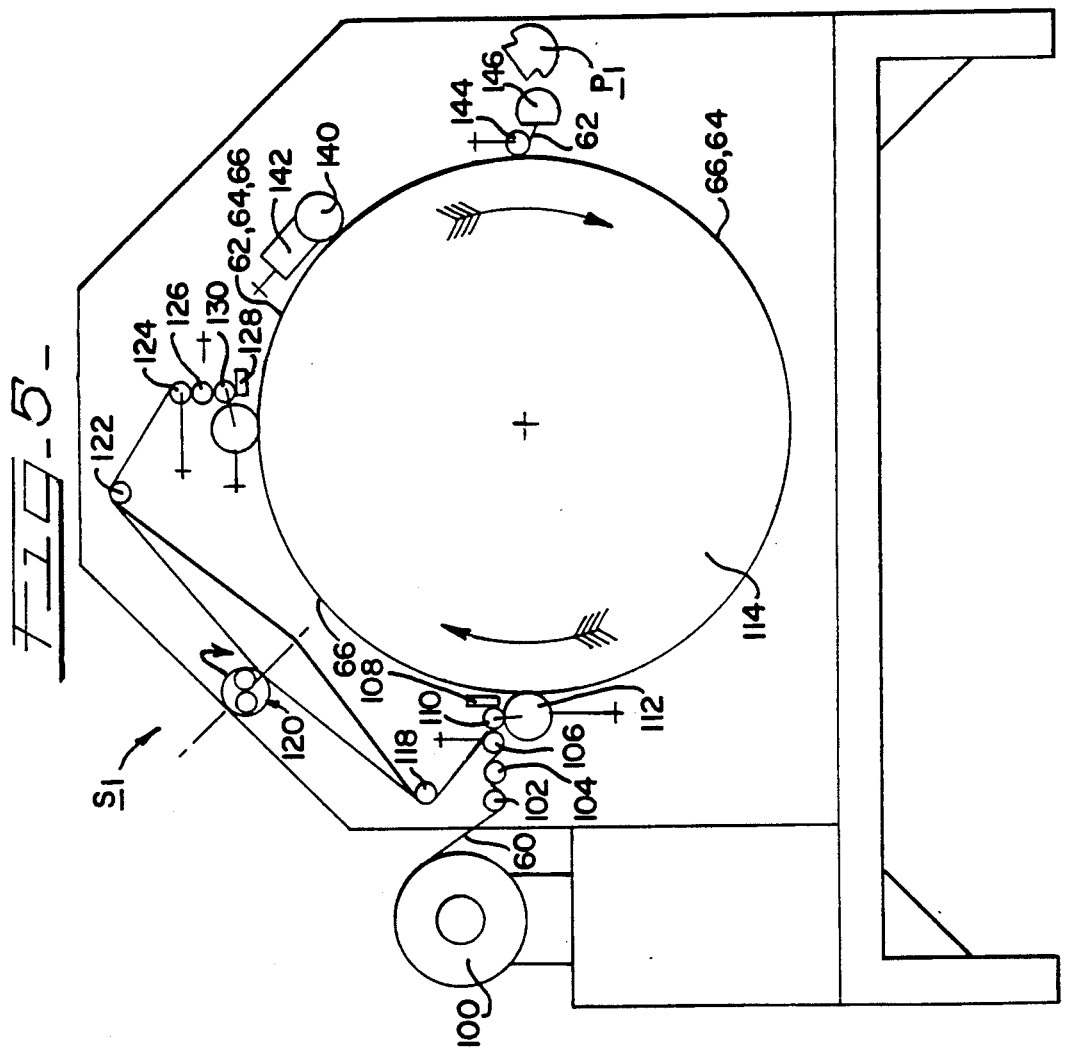
FIG. 5, on a smaller scale compared to FIG. 4, is a diagrammatic view of a preferred system for making a capacitive structure by a first mode for carrying out this invention.

As shown in FIG. 1, a capacitive structure 10 comprises a group of interleaved ribbons 12 of metallized, ultra thin, dielectric film, preferably poly(ethylene terephthalate) film having a thickness of about 0.2 $\mu$m to about 2.0 $\mu$m, as described in Yoshii et al. U.S. Pat. No. 4,756,064. Alternately, such film may be poly(phenylene sulfide) film or poly(ethylene naphthalate) film, as discussed above. Each ribbon 12 comprises a dielectric layer 14 of the ultra thin, dielectric film and a metallized layer 16, such as an aluminized layer, which covers one surface of the dielectric layer 14, except for narrow, longitudinal, demetallized lanes 18 dividing the metallized layer 16 into a relatively wide or major portion 20 and a relatively narrow or minor portion 22. Preferably, the metallized layer 16 is an aluminized layer having a thickness of about 300 angstroms.

The ribbons 12 are arranged in an alternating pattern, in a first group and a second group. In the first group, each ribbon 12 has the major portion 20 of its metallized layer 16 extending laterally to a given edge of such ribbon 12 (e.g. its right edge in FIG. 1) and is offset laterally so that the same edge extends beyond the near edges of the ribbons 12 of the second group. In the second group, each ribbon 12 has the major portion 20 of its metallized layer 16 extending laterally to the other edge of such ribbon 12 (e.g. its left edge in FIG. 1) and is offset laterally so that the same edge extends beyond the near edges of the ribbons 12 of the first group. Thus, indentations 30 are formed along the right edges of the ribbons 12, as shown in FIG. 1. Also, indentations 32 are formed along the left edges of the ribbons 12, as shown in FIG. 1.

A conductive, metallic mass 40 fills the indentations 30, so as to make electrical contact with the major portions 20 of the ribbons of the first group, and covers the right edges of the ribbons 12 of both groups. A conductive, metallic mass 50 fills the indentations 32, so as to make electrical contact with the major portions 20 of the ribbons of the second group, and covers the left edges of the ribbons 12 of both groups.

Thus, except for its use of metallized, ultra thin, poly(ethylene terephthalate) film, the capacitive structure 10 is similar to a capacitive structure disclosed in Rayburn U.S. Pat. No. 4,531,268, to which reference may be made for further details. However, the capacitive structure 10 is made by a novel method, which may be practiced in either of two modes disclosed herein. In a first mode disclosed herein for carrying out this invention, one coil of the interleaved webs is made from a laminate of indeterminate length. In a second mode disclosed herein for carrying out this invention, two coils of the interleaved webs are made from two laminates of indeterminate length. Each of the laminates is similar to the laminate employed in the first mode.

As shown in FIGS. 2 and 3, a laminate 60 exemplifies a preferred construction for the laminate or laminates used in each mode disclosed herein for carrying out this invention. The laminate 60 is provided in an indefinite length and comprising a carrier tape 62 with two opposite surfaces, a first web 64 of the metallized film adhering peelably to the carrier tape 62, and a second web 66 of the metallized film adhering peelably to the carrier tape 62. The webs 64, 66, adhere respectively to the opposite surfaces of the carrier tape 62. The carrier tape 62 is a web made from a relatively thick, dielectric film, such as a poly(ethylene terephthalate) film having a thickness of about 8.0 $\mu$m, as preferred, or a propylene copolymer film as described in Yoshii et al. U.S. Pat. No. 4,756,064.

The laminate 60 can be made by a method similar to an extension of the method disclosed in Yoshii et al. U.S. Pat. No. 4,756,064 (the disclosure of which is incorporated herein by reference) for making a laminated film. As noted above, the Yoshii et al. patent refers to a five-layer structure including two ultra thin, metal-deposited films. As shown, the laminate 60 is slittable longitudinally to make eight of the ribbons 12.

The first web 64 comprises a dielectric layer 68 of ultra thin, dielectric film, as discussed above. The first web 64 comprises a metallized layer 70, such as an aluminized layer, which covers one surface of the first web 64, except for narrow, longitudinal, demetallized lanes 72 spaced in a regular array across the first web 64. In each ribbon 12 made when the first web 64 is slitted in a manner to be later described, the dielectric layer 14 of such ribbon 12 is made from the dielectric layer 68 of the first web 64, and the metallized layer 16 of such ribbon 12 is made from the metallized layer 70 of the first web 64. Also, the demetallized lane 18 dividing the metallized layer 16 of such ribbon 12 into a major portion 20 and a minor portion 22 corresponds to one of the demetallized lanes 72 of the first web 64.

The second web 66 comprises a dielectric layer 78 of ultra thin, dielectric film, which is similar to the dielectric film used for the dielectric layer 68 of the first web 64. The second web 66 comprises a metallized layer 80, which is similar to the metallized layer 70 of the first web 64, and which covers one surface of the second web 66, except for narrow, longitudinal, demetallized lanes 82 spaced in a regular array across the second web 66. In each ribbon 12 made when the second web 66 is slitted in a manner to be later described, the dielectric layer 14 of such ribbon 12 is made from the dielectric layer 78 of the second web 66, and the metallized layer 16 of such ribbon 12 is made from the metallized layer 80 of the second web 66. Also, the demetallized lane 18 dividing the metallized layer 16 of such ribbon 12 into a major portion 20 and a minor portion 22 corresponds to one of the demetallized lanes 82 of the second web 66.

The demetallized lanes 72 of the first web 64 and the demetallized lanes 82 of the second web 66 are formed by removal of selected portions of the metallized layer 70 of the first web 64, along longitudinal lines, and by removal of selected portions of the metallized layer 80 of the second web 66, along longitudinal lines. Removal of selected portions of the metallized layers 70, 80, is effected by applying optical energy from a laser 90 to the metallized layer 80 of the first web 64 along longitudinal lines, as and where indicated by arrows in FIG. 3. Beams from the laser 90 vaporize selected portions of the metallized layer 70 of the first web 64, pass through the dielectric layer 68 of the first web 64, through the carrier tape 62, and through the dielectric layer 78 of the second web 66, to the metallized layer 80 of the second web 66, and vaporize selected portions of the metallized layer 80. Thus, each of the demetallized lanes 72 of the first web 64 is in opposed relation to one of the demetallized lanes 82 of the second web 66.

Thus, as used in each mode for carrying out this invention, the laminate 60 comprises, in consecutive order through the laminate 60, the metallized layer 70 of the first web 64, the dielectric layer 68 of the first web 64, the carrier tape 62, the dielectric layer 78 of the second web 66, and the metallized layer 80 of the second web 66.

In a first mode for carrying out this invention, a manufacturing system $S_1$ shown diagrammatically in FIG. 5 is used. The laminate 60 is supplied in one coil of indefinite length, from one supply reel 100, on which the laminate 60 is wound in such manner that the metallized layer 70 of the first web 64 faces outwardly in a radial sense. The supply reel 100 has a clutch (not shown) enabling the laminate 60 to be unwound from the supply reel 100 at a controlled tension.

Figure 4:
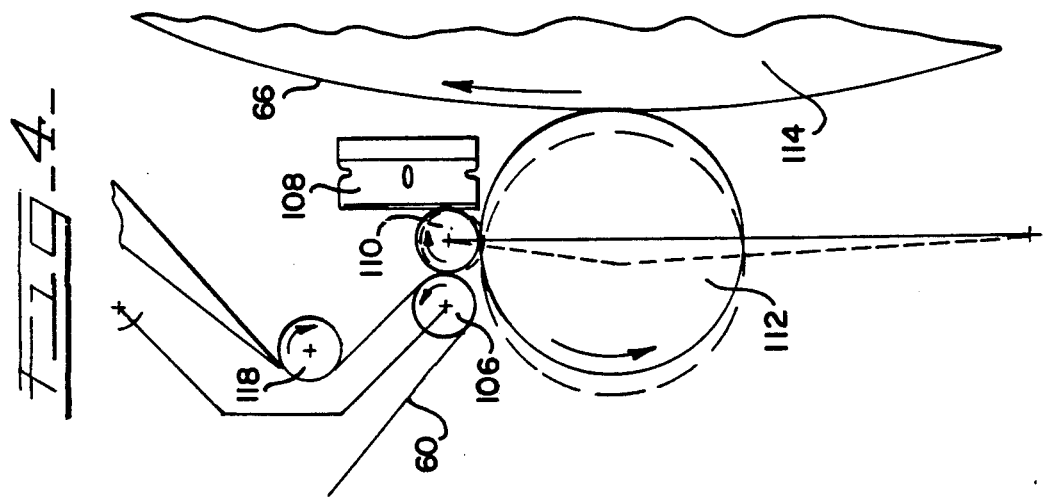
FIG. 4, on a smaller scale compared to each of FIGS. 1, 2, and 3, is a diagrammatic view of certain rollers and a razor blade, as used in handling the laminate.

As unwound from the supply reel 100, the laminate 60 is pulled successively over a tension-sensing roller 102, over an edge-guiding roller 104, and over a stripping roller 106, at which the second web 66 is peeled from the carrier tape 62, to which the first web 64 continues to adhere. As peeled therefrom, the second web 66 is slitted to provide from the second web 66, as slitted, the ribbons 12 of the second group in the capacitive structure 10. The second web 66 is slitted by razor blades 108 (one shown) coacting with a grooved roller 110, which is adjacent to the stripping roller 106, as shown in FIGS. 4 and 5, or which may be slightly spaced from the stripping roller 106.

As slitted, the second web 66 is pulled over the grooved roller 110 and over a larger, laying-on roller 112, which is adjacent to the grooved roller 110. The laying-on roller 112 is arranged to lay the slitted web 66 onto a drum 114, in such manner that the metallized layer 80 of the web 66 faces inwardly in a radial sense. The drum 114 is driven rotatably in a clockwise direction, as shown, in such a manner that the slitted web 66 is wound into a coil, on the drum 114, at a slightly greater tension compared to the controlled tension on the laminate 60 where the laminate 60 is unwound from the supply reel. Thus, when the first web 64 is wound over the second web 66, in a manner to be later described, the slightly greater tension on the second web 66 compensates for the second web 66 being slightly shorter compared to the first web 64. It is convenient to refer to the slitted web 66 as being wound into a coil, although the slitted web 66 is comprised of discrete ribbons, which are adjacent to one another.

After the second web 64 is peeled therefrom, the carrier tape 62 and the first web 64 adhering thereto are pulled over a direction-changing roller 118, which may be a tension-sensing roller, to an inverting or twisting mechanism 120 of a known type. The inverting or twisting mechanism 120 inverts or twists the carrier tape 62 and the first web 64 adhering thereto by one half-turn. As inverted or twisted, the carrier tape 62 and the first web 64 adhering thereto are pulled successively over a direction-changing roller 122, over a tension-sensing roller 124, which is similar to the tension-sensing roller 104 and over an edge-guiding roller 126, which is similar to the edge-guiding roller 106. Next, the carrier tape 62 and the first web 64 adhering thereto are slitted by razor blades 128 (one shown) coacting with a grooved roller 130, which is adjacent to the edge-guiding roller 126, as shown in FIG. 5. The razor blades 128 are similar to the razor blades 108 and the grooved roller 130 is similar to the grooved roller 110.

As slitted, the carrier tape 62 and the first web 64 adhering thereto are pulled over the grooved roller 130, and over a larger, laying-on roller 132, which is adjacent to the grooved roller 130. The laying-on roller 132 is arranged to lay the carrier tape 62 and the first web 64 adhering thereto, as slitted, over the slitted web 66, onto the drum 114, in such manner that the metallized layer 70 of the slitted web 64 faces inwardly in a radial sense. Thus, the slitted tape 62 overlies the slitted web 64, which continues to adhere to the slitted tape 62. It is convenient to refer to the slitted tape 62 and the slitted web 64 adhering thereto as being wound over the slitted web 66, although the slitted tape 62 and the slitted web 64 adhering thereto are comprised of discrete ribbons, which are adjacent to one another.

The various rollers described above are arranged in such manner that the carrier tape 62 and the first web 64 adhering thereto, as laid over the second web 66, are offset laterally with respect to the second web 66, in such manner that the ribbons 12 of the first group, as slitted from the first web 64, and the ribbons 12 of the second group, as slitted from the second web 66, are offset laterally in the capacitive structure 10.

The grooved roller 110 and the razor blades 108 are mounted pivotally to the laying-on roller 112, so as to pivot on the axis of the laying-on roller 112. The laying-on roller 112 and the stripping roller 106 respectively are mounted pivotally to a fixed framework. The grooved roller 130 and the razor blades 128 are mounted pivotally to the laying-on roller 132, so as to pivot on the axis of the laying-on roller 132. The laying-on roller 132, the tension-sensing roller 124 to fixed framework and the edge-guiding roller 126 respectively are mounted pivotally to the fixed framework. These rollers and razor blades, as mounted pivotally, accommodate a growing number of turns being wound onto the drum 114.

After the slitted tape 62 and the slitted web 64 adhering thereto are wound into the coil, over the slitted web 66, the slitted web 64 is heat-tacked to the slitted web 66, through the slitted tape 62, via a roller 140, which is heated to a suitable temperature (e.g. about 207° C.) by a heater 142, such as an incandescent lamp. The heated roller 140 applies a localized pressure (e.g. about 400 psi) and heats the slitted web 64, so as to heat the metallized layer 70 via heat radiating through the slitted tape 62) to a suitable temperature (e.g. about 200° C.) to heat-tack the metallized layer 70 of the slitted web 64 to the dielectric layer 78 of the slitted web 66, but not to heat-tack the slitted tape 62 to the dielectric layer 68 of the slitted web 64. The heated roller 140 is mounted pivotally to the fixed framework, so as to accommodate a growing number of turns being wound onto the drum 114. It is convenient to refer to the slitted web 64 as being heat-tacked to the slitted web 66, although the slitted webs 64, 66, are comprised of discrete ribbons, as noted above.

After the slitted web 64 is heat-tacked to the slitted web 66, through the carrier tape 62, the slitted tape 62 is peeled from the slitted web 64 at a stripping roller 144. As peeled from the first web 64, the slitted tape 62 is drawn into a vacuum device 146, which removes the slitted tape 62. The stripping roller 144 is mounted pivotally to the fixed framework, so as to accommodate a growing number of turns being wound onto the drum 114. It is convenient to refer to the slitted tape 62 as being peeled from the slitted web 64, and as being drawn into the vacuum device 146, although the slitted tape 62 is comprised of discrete ribbons.

In the manufacturing system $S_1$, which is substantially enclosed, a pyrometer $P_1$ is used to monitor temperature conditions and to control the heater 142, via known control techniques.

The heat-tacking techniques described above may be widely applied in making capacitive structures comprising interleaved webs of metallized, dielectric film, as described above, wherein a laminate comprising a carrier tape and a first web adhering peelably to the carrier tape is provided, along with a second web of such film. The second web is wound into a coil or placed otherwise in such manner that its metallized layer faces in a given direction. The first web is wound onto the second web or placed otherwise onto the second web, along with the carrier tape having the first web adhering peelably thereto, in such manner that the first web faces in the same direction. The first web is heat-tacked to the second web, through the carrier tape, which may be peeled from the first web after the first web has been heat-tacked to the second web.

The heat-tacking techniques are effective because a major part of the energy radiating from the heated roller is transmitted through the carrier tape, and through the dielectric layer of the web adhering peelably thereto, to the metallized layer of the adhering web. Thus, although their junction temperature is insufficient to produce localized fusion of the carrier tape and the dielectric layer of the adhering web, the metallized layer of the adhering web is heated sufficiently to fuse to the dielectric layer of the underlying web, under the localized pressure imparted by the heated roller. Typically, maximum energy radiates from the heated roller at a wavelength of about 6.033 $\mu$m, if the heated roller is maintained at a temperature of about 207° C. At that wavelength, about 60% of the radiated energy is transmitted through a carrier tape of poly(ethylene terephthalate having a thickness of about 8 $\mu$m. If the dielectric layer of a metallized, dielectric web adhering peelably to the carrier tap is made of poly(ethylene terephthalate) having a thickness of about 2$\mu$, localized fusion does not occur between the carrier tape an the dielectric layer of the adhering web. If the metallized layer of the adhering web is an aluminized layer having a thickness of about 300 angstroms, such metallized layer is heated to about 200° C., under a localized pressure of about 400 psi imparted by the heated roller, whereby such metallized layer fuses to the dielectric layer of the underlying web. Because of re-radiation from the metallized layers, several successive webs wound or placed otherwise onto one another may be heat-tacked to one another, in a single application of the heated roller.

In a second mode for carrying out this invention, a manufacturing system $S_2$ shown diagrammatically in FIG. 6 is used. The laminate described above is supplied in two coils of indefinite length, from two supply reels, namely a first supply reel 200 an a second supply reel 202, on each of which the laminate is wound in such manner that the metallized layer of its first web faces outwardly in a radial sense. Each supply reel has a clutch (not shown) enabling the laminate to be unwound from such supply reel at a controlled rate.

It is convenient to refer to the laminate in the coil supplied from the first supply reel 200 as a first laminate 60a comprising a carrier tape 62a, a first web 64a with a dielectric layer and with a metallized layer, and a second web 66a with a dielectric layer and with a metallized layer. It is convenient to refer to the laminate in the coil supplied from the second supply reel 202 as a second laminate 60b comprising a carrier tape 62b, a first web 64b with a dielectric layer and with a metallized layer, and a second web 66b with a dielectric layer and a metallized layer.

As unwound from the first supply reel 200, the first laminate 60a is pulled over a stripping roller 204 where the second web 66a is peeled from the carrier tape 62a, to which the first web 64a continues to adhere. As peeled therefrom, the second web 66a is slitted by razor blades 206 (one shown) coacting with a grooved roller 208, which is adjacent to the stripping roller 204, As slitted, the second web 66a from the first laminate 60a is pulled over the grooved roller 208 and over a larger, laying-on roller 214, which is adjacent to the grooved roller 208. The laying-on roller 214 is arranged to lay the slitted web 66a from the first laminate 60a onto a first drum 216, in such manner that the metallized layer of the slitted web 66a faces inwardly in a radial sense. The first drum 216 is driven rotatably in such manner that the slitted web 66a from the first laminate 60a is wound into a first coil on the first drum 216.

As unwound from the second supply reel 202, the second laminate 60b is pulled over a stripping roller 218, where the second web 66b is peeled from the carrier tape 62b, to which the first web 64b continues to adhere. As peeled therefrom, the second web 66b is slitted by razor blades 220 (one shown) coacting with a grooved roller 222, which is adjacent to the stripping roller 218.

As slitted, the second web 66b from the second laminate 60b is pulled over the grooved roller 222 and over a larger, laying-on roller 228, which is adjacent to the grooved roller 222. The laying-on roller 228 is arranged to lay the slitted web 66b from the second laminate 60b onto a second drum 230, in such manner that the metallized layer of the slitted web 66b faces inwardly in a radial sense. The second drum 230 is driven rotatably in such manner that the slitted web 66b from the second laminate 60b is wound into a second coil on the second drum 230.

After the second web 66b is peeled therefrom, the carrier tape 62b and the first web 64b adhering thereto from the second laminate 60b are pulled through, a series of rollers 240, 242, 244, which includes a tension-sensing roller 242, and past an edge-guiding roller 246. Next, the carrier tape 62b and the first web 64b adhering thereto are slitted by razor blades 248 (one shown) coacting with a grooved roller 250, which is adjacent to the edge-guiding roller 246. The carrier tape 62b and the first web 64b adhering thereto are pulled between the edge-guiding roller 246 and the grooved roller 250 before being slitted.

As slitted, the carrier tape 62b and the first web 64b adhering thereto from the second laminate 60b are pulled over the grooved roller 250, and over a laying-on roller 252, which is adjacent to the grooved roller 250. The laying-on roller 252 is arranged to lay the carrier tape 62b and the first web 64b adhering thereto, as slitted, over the second web 66a from the first laminate, onto the first drum 216, in such manner that the metallized layer of the slitted web 64a faces inwardly in a radial sense.

The various rollers coacting with the carrier tape 62b and the first web 64b are arranged in such manner that the slitted tape 62b and the slitted web 64b adhering thereto, as laid over the slitted web 66a from the first laminate 60a, are offset laterally with respect to the web 66a. Consequently, the ribbons of the first group, as slitted from the web 64b, and the ribbons of the second group, as slitted from the web 66a, are offset laterally in capacitive structures made from the first coil on the first drum 216.

The grooved roller 280 and the razor blades 248 are mounted pivotally to the laying-on roller 252. The laying-on roller 252 and the edge-guiding roller 246 respectively are mounted pivotally to the fixed framework. These rollers and razor blades, as mounted pivotally, are similar to those rollers and razor blades shown in FIG. 4 and described above, for similar purposes and accommodate a growing number of turns being wound onto the first drum 216.

After the slitted tape 62b and the slitted web 64b from the second laminate 60b are wound into the first coil, over the slitted web 66a from the first laminate 60a, the slitted web 64b is heat-tacked to the slitted web 66a, through the slitted tape 62b, via a roller 260, which is heated to a suitable temperature (e.g. about 207° C.) by a heater 262, such as an incandescent lamp. The heated roller 260 applies a localized pressure (e.g. about 400 psi) and heats the slitted web 64b, so as to heat its metallized layer (via heat radiated through the slitted tape 62b) to a suitable temperature (e.g. about 200° C.) to heat tack the metallized layer of the slitted web 64b to the dielectric layer of the web 66a, but not to heat-tack the slitted tape 62b to the dielectric layer of the slitted web 64b. The heated roller 260 is mounted pivotally to the fixed framework, so as to accommodate a growing number of turns being wound onto the first drum 216.

After the slitted web 64b is heat-tacked to the slitted web 66a, through the slitted tape 62b, the slitted tape 62b is peeled from the web 64b at a stripping roller 264. As peeled from the web 64b, the slitted tape 62b is drawn into a vacuum device 266, which removes the carrier tape 62b. The stripping roller 264 is mounted pivotally to the fixed framework, so as to accommodate a growing number of turns being wound onto the first drum 216.

After the second web 66a from the first laminate 60a is peeled therefrom, the carrier tape 62a and the first web 64a adhering thereto from the first laminate 60a are pulled through a series of rollers 270, 272, 274, which include a tension-sensing roller 272, and past an edge-guiding roller 276. Next, the carrier tape 62a and the first web 64a adhering thereto are slitted by razor blades 278 (one shown) coacting with a grooved roller 280, which is adjacent to the edge-guiding roller 276 The carrier tape 62a and the first web 64a adhering thereto are pulled between the edge-guiding roller 276 and the grooved roller 280 before being slitted As slitted, the carrier tape 62a and the first web 64a adhering thereto from the first laminate 60a are pulled over the grooved roller 280, and over a larger, laying-on roller 282, which is adjacent to the grooved roller 280. The laying-on roller 282 is arranged to lay the carrier tape 62a and the first web 64a adhering thereto, as slitted, over the second web 66b from the second laminate 60b, onto the second drum 230, in such manner that the metallized layer of the slitted web 64a faces inwardly in a radial sense.

The various rollers coacting with the carrier tape 62a and the first web 64a adhering thereto from the first laminate 60a are arranged in such manner that the slitted tape 62a and the slitted web 64a adhering thereto as laid over the slitted web 66b from the second laminate 60b, are offset laterally with respect to the slitted web 66b. Consequently, the ribbons of the first group, as slitted from the web 64b, and the ribbons of the second group, as slitted from the web 66b, are offset laterally in capacitive structures made from the second coil on the second drum 230.

The grooved roller 280 and the razor blades 278 are mounted pivotally to the laying-on roller 282, so as to pivot on the axis of the laying-on roller 282. The laying-on roller 282 and the edge-guiding roller 276 respectively are mounted pivotally to a fixed framework. These rollers and razor blades, as mounted pivotally, are similar to those rollers and razor blades shown in FIG. 4 and described above for similar purposes and accommodate a growing number of turns being wound onto the second drum 230.

After the slitted tape 62a and the slitted web 64a from the first laminate 60a are wound into the second coil, over the slitted web 66b from the second laminate 60b, the slitted web 64a is heat-tacked to the slitted web 66b, through the slitted tape 62a, via a roller 290, which is heated to a suitable temperature (e.g. about 207° C.) by a heater 292, such as an incandescent lamp. The heated roller 290 applies a localized pressure (e.g. about 400 psi) and heats the slitted web 64a, so as to heat its metallized layer (via heat radiated through the slitted tape 62a) to a suitable temperature (e.g. about 200° C.) to heat-tack the metallized layer of the slitted web 64a to the the slitted tape 62a to the dielectric layer of the slitted web 64a. The heated roller 290 is mounted pivotally to the fixed framework, so as to accommodate a growing number of turns being wound onto the second drum 230.

After the slitted web 64a is heat-tacked to the web 66b, through the slitted tape 62a, the carrier tape 62a is peeled from the web 64a at a stripping roller 294. As peeled from the web 64a, the carrier tape 62a is drawn into a vacuum device 266, which removes the slitted tape 62a. The stripping roller 294 is mounted pivotally to the fixed framework, so as to accommodate a growing number of turns being wound onto the second drum 230.

In the manufacturing system $S_2$, which is enclosed substantially, two pyrometers $P_2$ are used to monitor temperature conditions and to control the heaters 262, 292, via known control techniques.

The coil produced by the first mode for carrying out this invention and the coils produced by the second mode therefor can be further processed by known manufacturing methods (see, e.g., the aforenoted Rayburn and Rayburn et al. patents, the disclosures of which are incorporated herein by reference) to produce, in large quantities, capacitive elements of the type noted above.

As shown in FIGS. 7 and 8, a laminate 300 exemplifies an alternate construction for the laminate or laminates used in each mode for carrying out this invention. The laminate 300 is comprised of two webs of relatively thick, metallized, dielectric film, such as a metallized, poly(ethylene terephthalate) film having a thickness in a range from about 0.5 μm to about 8.0 μm, preferably 8.0 μm. Thus, a first web 302 of the laminate 300 has a metallized layer 304 and an opposite, dielectric layer 306. Also, a second web 308 of the laminate 300 has a metallized layer 310 and an opposite dielectric layer 312. In the laminate 300, the webs 302, 308, adhere peelably to each other at their dielectric layers 306, 312, so that their metallized layers 30, 310, define two opposite surfaces of the laminate 300. The laminate 300 can be made by any suitable method known for making laminated film.

The metallized layer 304 covers one surface of the first web 302, except for narrow, longitudinal, demetallized lanes 314 spaced in a regular array across the first web 302. The metallized layer 310 covers one surface of the second web 308, except for narrow, longitudinal, demetallized lanes 316 spaced in a regular array across the second web. The demetallized lanes 314 of the first web 302 and the demetallized lanes 316 of the second web 308 are formed by removal of selected portions of the metallized layer 304, along longitudinal lines, and by removal of selected portions of the metallized layer 310, along longitudinal lines. Removal of selected portions of the metallized layers 304, 310, is effected by applying optical energy from a laser 320 to the metallized layer 304 of the first web 302, as and where indicated by arrows in FIG. 8. Beams from the laser 320 vaporize selected portions of the metallized layer 304 of the first web 302, pass through the dielectric layer 306 of the first web 302, and through the dielectric layer 312 of the second web 308, and vaporize selected portions of the metallized layer 310 of the second web 308. Thus, each of the demetallized lanes 314 of the first web 302 is in opposed relation to one of the demetallized lanes 316 of the second web 308.

Thus, the laminate 300 is substitutable for the laminate 60 in the manufacturing system $S_1$ associated with the first mode for carrying out this invention. Also, the laminate 300 is substitutable for the laminates 60a, 60a, in the manufacturing system $S_2$ associated with the second mode for carrying out this invention. In either instance, since the laminate 300 does not comprise a carrier tape, there is no need for the manufacturing system to include mechanisms for stripping a carrier tape or for removing a carrier tape from the manufacturing system.

Various changes may be made in either system disclosed herein without departing from the scope and spirit of this invention.

I claim:

1. A method for making capacitive structures comprising interleaved webs of metallized, dielectric film, wherein each web has a metallized layer and an opposite, dielectric layer, the method comprising steps of
    (a) providing a laminate of indeterminate length, the laminate comprising plural webs including a first web of said film adhering peelably to another web of the laminate and a second web of said film adhering peelably to another web of the laminate
    (b) peeling the second web from the last-mentioned web and winding the second web into a coil in such manner that the metallized layer of the second web faces in a given radial direction,
    (c) winding the first web onto a similar web wound into a coil in such manner that the metallized layer of the first web faces in the same radial direction, and
    (d) heat-tacking the first web to the similar web.

2. The method of claim 1 wherein the laminate comprises a carrier tape with two opposite surfaces, the first and second webs adhering respectively to the opposite surfaces of the carrier tape, which constitutes one of the webs of the laminate, wherein the first web is wound onto the similar web along with the carrier tape having the first web adhering peelably thereto, wherein the first web is heat-tacked to the similar web through the carrier tape, and wherein the steps comprise
    (e) peeling the carrier tape from the first web after the first web has been heat-tacked to the similar web.

3. The method of claim 1 wherein the similar web, onto which the first web is wound, is the first web.

4. A method for making capacitive structures comprising interleaved webs of metallized, dielectric film, wherein each web has a metallized layer and an opposite, dielectric layer, the method comprising steps of
    (a) providing a laminate of indeterminate length, the laminate comprising a first web of said film adhering peelably to another web of said film and a second web of said film adhering peelably to another web of said film,
    (b) peeling the second web from the last-mentioned web and winding the second web into a coil in such manner that the metallized layer of the second web faces in a given radial direction,
    (c) twisting the first web, by one half-twist, after the second web has been peeled therefrom and
    (d) winding the first web onto the second web in such manner that the metallized layer of the first web faces in the same radial direction,
whereby said webs are wound into the coil, in which said webs are interleaved.

5. The method of claim 4 wherein the laminate comprises a carrier tape with two opposite surfaces, the first and second webs adhering respectively to the opposite surfaces of the carrier tape, which constitutes one of the webs of the laminate, wherein the first web is wound onto the second web along with the carrier tape having the first web adhering peelably thereto, and wherein the steps comprise
    (e) peeling the carrier tape from the first web after the first web has been wound onto the second web.

6. The method of claim 5 wherein in the laminate, as provided, the first web adheres peelably to the carrier tape at the dielectric layer of the first web and the second web adheres peelably to the carrier tape at the dielectric layer of the second web.

7. The method of claim 4 wherein the steps comprise slitting the second web into a selected number of second ribbons before winding the second web into the coil and slitting the first web into the selected number of first ribbons before winding the first web onto the second web.

8. The method of claim 7 wherein the steps comprise removing selected portions of the metallized layers of the web, of said film, in such manner that each web of said film has the selected number of narrow, longitudinal, demetallized lanes, which are arranged in such manner that each ribbon has one of the demetallized lanes dividing the metallized layer of such ribbon into a major portion and a minor portion.

9. The method of claim 8 wherein the coil has an axis and wherein said webs are wound into the coil in such manner that the first ribbons are offset axially from the second ribbons.

10. The method of claim 8 wherein the step of removing selected portions of the webs of said film is effected by applying optical energy in beams from a laser to the metallized layer of a selected one of the webs of said film along longitudinal lanes, in such manner that optical energy in beams from the laser vaporize selected portions of the metallized layer of the selected web, passes through the dielectric layer of the selected web and through the dielectric layer of the remaining web of said film, to the metallized layer of the remaining web of said film, and vaporizes selected portions of the metallized layer of the remaining web of said film.

11. The method of claim 8 wherein the dielectric layer of each web of said film is a relatively thin layer of dielectric film adhering peelably to a carrier tape, which is a relatively thick tape of dielectric film constituting one of the webs of the laminate, and wherein the step of removing selected portions of the metallized layers of the webs of said film is effected by applying optical energy in beams from a laser to the metallized layer of a selected one of the webs of said film along longitudinal lanes, in such manner that optical energy in beams from the laser vaporizes selected portions of the metallized layer of the selected web, passes through the dielectric layer of the selected web, through the carrier tape, and through the dielectric layer of the remaining web of said film, to the metallized layer of the remaining web of said film, and vaporizes selected portions of the metallized layer of the remaining web of said film.

12. The method of claim 11 wherein the steps comprise, in each turn of the coil, heat-tacking the first web to the second web, through the carrier tape, before the carrier tape is peeled from the first web.

13. The method of claim 4 wherein the steps comprise, in each turn of the coil, heat-tacking the first web to the second web after winding the first web onto the second web.

14. A method for making capacitive structures comprising interleaved webs of metallized, dielectric film, wherein each web of metallized, dielectric film has a metallized layer and an opposite, dielectric layer, the method comprising steps of
  (a) providing similar first and second laminates of indeterminate lengths, wherein each laminate comprises plural webs including
    (1) a first web of said film adhering peelably to another web of such laminate and
    (2) a second web of said film adhering peelably to another web of such laminate, and
  (b) forming a first coil and a second coil from the first and second laminates by
    (1) peeling the second webs respectively from the carrier tape of the first and second laminates,
    (2) winding the second web from the first laminate and the first web from the second laminate into the first coil, in such manner that the first web from the second laminate is wound onto the second web from the first laminate, that the metallized layers of the webs wound into the first coil face in a common radial direction, and that the webs wound into the first coil are interleaved, and
    (3) winding the second web from the second laminate and the first web from the first laminate into the second coil, in such manner that the first web from the first laminate is wound onto the second web from the second laminate, that the metallized layers of the webs wound into the second coil face in a common radial direction, and that the webs wound into the second coil are interleaved.

15. The method of claim 14 wherein each laminate comprises a carrier tape with two opposite surfaces, the carrier tape constituting one of the webs of such laminate, wherein the second web from the first laminate and the first web from the second laminate are wound into the first coil along with the carrier tape having the first web from the second laminate adhering thereto, wherein the second web from the second laminate and the first web from the first laminate are wound into the second coil along with the carrier tape having the first web from the first web adhering thereto, and wherein the carrier tapes are peeled from the first webs after the first webs have been wound onto the second webs.

16. The method of claim 14 wherein the steps comprise slitting each of the first webs into a selected number of first ribbons before winding the first webs into the respective coils and slitting each of the second webs into the selected number of second ribbons before winding the first webs into the respective coils.

17. The method of claim 16 wherein the steps comprise removing selected portions of the metallized layers of the webs of said film in each laminate, before peeling either web from either laminate, in such manner that each web of said film from each laminate has the selected number of narrow, longitudinal, demetallized lanes, which are arranged in such manner that each ribbon from each web of said film from each laminate has one of the demetallized lanes dividing the metallized layer of such ribbon into a major portion and a minor portion.

18. The method of claim 17 wherein the step of removing selected portions of the metallized layers of the webs of said film in each laminate is effected by applying optical energy in beams from a laser to the metallized layer of a selected one of the webs of said film along longitudinal lanes, in such manner that optical energy in beams from the laser vaporizes selected portions of the metallized layer of the selected web, passes through the dielectric layer of the remaining web of said film and through the dielectric layer of the remaining web of said film, to the metallized layer of the remaining web of said film, and vaporizes selected portions of the metallized layer of the remaining web of said film.

19. The method of claim 17 wherein the dielectric layer of each web of said film is a relatively thin layer of dielectric film adhering peelably to a carrier tape, which is a relatively thick tape of dielectric film constituting one of the webs of the laminate comprising such web of said film, and wherein the step of removing selected portions of the metallized layers of the webs of said film in each laminate is effected by applying optical energy in beams from a laser to the metallized layer of a selected one of the webs of said film along longitudinal lanes, in such manner that optical energy in beams from the laser vaporizes selected portions of the metallized layer of the selected web, passes through the dielectric layer of the selected web, through the carrier tape, and through the dielectric layer of the remaining web of said film, to the metallized layer of the remaining web of said film, and vaporizes selected portions of the metallized layer of the remaining web of said film.

20. The method of claim 19 wherein the steps comprise, in each turn of each coil, heat-tacking the first web of such coil to the second web of such coil, through the carrier tape wound with the first web of such coil, after the first web of such coil is wound onto the second web of such coil and before the carrier tape wound therewith is peeled from the first web of such coil.

21. The method of claim 16 wherein each coil has an axis and wherein the webs of said film are wound into the respective coils in such manner that the first ribbons are offset axially from the second ribbons.

22. The method of claim 21 wherein in each laminate, as provided, the first web adheres peelably to a carrier tape at the dielectric layer of the first web and the second web adheres peelably to the carrier tape at the dielectric layer of the second web, the carrier tape constituting one of the webs of such laminate.

23. The method of claim 14 wherein the steps comprise, in each turn of each coil, heat-tacking the first web of such coil to the first web of such coil after winding the first web of such coil onto the first web of such coil.

24. A method for making a capacitive element from metallized, dielectric film having a metallized layer and an opposite, dielectric layer, the method comprising steps of
  (a) providing a laminate of indeterminate length, the laminate comprising a first web of said film and a second web of said film, and
  (b) removing selected portions of the metallized layers of said webs in such manner that each web has the selected number of narrow, longitudinal, demetallized lanes, by applying optical energy from a laser to the metallized layer of a selected one of said webs of each laminate in such manner that optical energy from the laser removes selected portions of the metallized layer of the selected web, passes through the selected web and through the remaining one of said webs of such laminate, to the metallized layer of the remaining web of such laminate, and removes selected portions of the metallized layer of the remaining web of such laminate.

25. The method of claim 24 wherein the laminate comprises a carrier tape with two opposite surfaces, the first and second webs respectively adhering peelably to the opposite sides of the carrier tape.

26. The method of claim 25 wherein the dielectric layer of each web is a layer of film selected from the group consisting of poly(ethylene terephthalate) film, poly(phenylene sulfide) film, and poly(ethylene naphthalate) film 27. The method of claim 25 wherein the dielectric layer of each web is a relatively thin layer of poly(ethylene terephthalate) film and the carrier tape is a relatively thick layer of dielectric film.

28. The method of claim 27 wherein the carrier tape is a relatively thick tape of poly(ethylene terephthalate) film.

29. A method for making capacitive structures comprising interleaved webs of metallized, dielectric film, wherein each web of metallized, dielectric film has a metallized layer and an opposite, dielectric layer, the method comprising steps of
  (a) providing a laminate comprising a carrier tape and a first web of said film adhering peelably to the carrier tape,
  (b) placing a second web of said film in such manner that the metallized layer of said second web faces in a given direction,
  (c) placing the first web onto the second web, along with the carrier tape having the first web adhering peelably thereto, in such manner that the metallized layer of the first web faces in the same direction, and
  (d) heat-tacking the first web to the second web, through the carrier tape 30. The method of claim 29 comprising a further step of
  (e) peeling the carrier tape from the first web after the first web has been heat-tacked to the second web.

31. Apparatus for making a capacitive structure comprising interleaved webs of metallized, dielectric film, each web having a metallized layer and an opposite, dielectric layer, from materials including a laminate of indeterminate length, the laminate comprising plural webs including a first web adhering peelably to another web of the laminate and a second web of said film adhering peelably to another web of the laminate, the apparatus comprising
  (a) means for peeling the second web from the last-mentioned web and winding the second web into a coil in such manner that the metallized layer of the second web faces in a given radial direction,
  (b) means for winding the first web onto a similar web wound into a coil, in such manner that the metallized layer of the first web faces in the same radial direction, and
  (c) means for heat-tacking the first web to the similar web.

32. The apparatus of claim 31 wherein the laminate comprises a carrier tape constituting one of the webs of the laminate, the first and second webs adhering respectively to the opposite sides of the carrier tape, wherein the heat-tacking means heat tacks the first web to the similar web through the carrier tape, and wherein the apparatus comprises
  (d) means for peeling the carrier tape from the first web after the first web has been heat-tacked to the similar web.

33. The apparatus of claim 31 wherein the means for winding the first web onto a similar web wound into a coil is constituted by means for winding the first web onto the second web, in such manner that the metallized layer of the first web faces in the same radial direction.

34. Apparatus for making capacitive structures comprising interleaved webs of metallized, dielectric film, each web having a metallized layer and an opposite, dielectric layer, from a laminate of indeterminate length, the laminate comprising plural webs including a first web of said film adhering peelably to another web of the laminate and a second web of said film adhering peelably another web of the laminate, wherein the apparatus comprises
  (a) means for peeling the second web from the last-mentioned web and winding the second web into a coil in such manner that the metallized layer of the second web faces in a given radial direction,
  (b) means for twisting the first web, by one half-twist, after the second web has been peeled therefrom, and
  (c) means for winding the first tape onto the second web in such manner that the first web faces in the same radial direction.

35. The apparatus of claim 34 wherein the laminate comprises a carrier tape with two opposite surfaces, the first and second webs adhering respectively to opposite surfaces of the carrier tape, which constitutes one of the webs of the laminate, wherein the winding means winds the first web onto the second web along with the carrier tape having the first web adhering peelably thereto, and wherein the apparatus comprises (d) means for peeling the carrier tape from the first web after the first web has been wound onto the second web.

36. The apparatus of claim 34 comprising means for slitting the second web into a selected number of first ribbons before the second web is wound into the coil and for slitting the first web into the selected number of first ribbons before the first web is wound onto the second web.

37. The apparatus of claim 36 comprising means for removing selected portions of the metallized layers of the webs in the laminate in such manner that each web has the selected number of narrow, longitudinal, demetallized lanes, which are arranged in such manner that each ribbon has one of the demetallized lanes dividing the demetallized layer of such ribbon into a major portion and a minor portion.

38. The apparatus of claim 37 wherein the coil has an axis and the winding means is arranged for winding the webs into the coil in such manner that the first ribbons are offset axially from the second ribbons.

39. The apparatus of claim 37 wherein the means for removing selected portions of the metallized layers of the webs of said film is arranged for applying optical energy in beams from a laser to the metallized layer of a selected one of the webs of said film along longitudinal lanes, in such manner that optical energy in beams from the laser vaporizes selected portions of the metallized layer of the selected web, passes through the dielectric layer of the selected web and through the dielectric layer of the remaining web of said film to the metallized layer of the remaining web of said film, and vaporizes selected portions of the metallized layer of the remaining web of said film.

40. The apparatus of claim 37 wherein the laminate comprises a carrier tape with two opposite surfaces, the first and second webs adhering respectively to the opposite surfaces of the carrier tape, which constitutes one of the webs of the laminate, and wherein the means for removing selected portions of the metallized layers of the webs of said film is arranged for applying optical energy in beams from a laser to the metallized layer of a selected one of the webs of said film along longitudinal lanes, in such manner that optical energy in beams from the laser vaporizes selected portions of the metallized layer of the selected web, passes through the dielectric layer of the selected web, through the carrier tape, and through the dielectric layer of the remaining web of said film, to the metallized layer of the remaining web of said film, and vaporizes selected portions of the metallized layer of the remaining web of said film.

41. The apparatus of claim 40 comprising means for heat-tacking the first web to the second web in each turn of the coil, through the carrier tape, before the carrier tape is peeled from the first web.

42. The apparatus of claim 34 comprising means for heat-tacking the first web to the second web, in each turn of the coil, after the first web is wound onto the second web.

43. Apparatus for making capacitive structures comprising interleaved webs of metallized, dielectric film, each web having a metallized layer and an opposite, dielectric layer, from similar first and second laminates of indeterminate lengths, each laminate comprising plural webs including a first web of said film adhering peelably to another web of such laminate and a second web of said film adhering peelably to another web of such laminate, wherein the apparatus comprises (a) means for peeling the second web from of the first laminate, (b) means for peeling the second web from the second laminate, (c) means for winding the second web from the first laminate and the first web from the second laminate into a first coil, in such manner that the first web from the second laminate is wound onto the second web from the first laminate, that the metallized layers of the webs wound into the first coil face in a common radial direction, and that the webs wound into the first coil are interleaved, and (d) means for winding the second web from the second laminate and the first web from the first laminate into a second coil, in such manner that the first web from the first laminate is wound onto the second web from the second laminate, that the metallized layers of the webs wound into the second coil face in a common radial direction, and that the webs wound into the second coil are interleaved.

44. The apparatus of claim 43 wherein each laminate comprises a carrier tape with two opposite surfaces, the carrier tape constituting one of the webs of such laminate, wherein each winding means winds the second web from one such laminate and the first web from the other laminate into one such coil along with the carrier tape having the first web from the last-mentioned laminate adhering peelably thereto, and wherein the apparatus comprises (e) means for peeling the carrier tape from the first web from the first laminate and (f) means for peeling the carrier tape from the first web from the second laminate.

45. The apparatus of claim 43 comprising means for slitting each of the first webs into a selected number of first ribbons, before the first webs are wound into the respective coils, and means for slitting each of the second webs into a selected number of second ribbons, before the second webs are wound into the respective coils.

46. The apparatus of claim 45 comprising means for removing selected portions of the metallized layers of the webs of said film in each laminate, in such manner that each web of said film from each laminate has the selected number of narrow, longitudinal, demetallized lanes, which are arranged in such manner that each ribbon from each web of said film from each laminate has one of the demetallized lanes dividing the metallized layer of such ribbon into a major portion and a minor portion.

47. The apparatus of claim 46 wherein the means for removing selected portions of the metallized layers of the webs of said film in each laminate is arranged for applying optical energy in beams from a laser to the metallized layer of a selected one of the webs of said film along longitudinal lanes, in such manner that optical energy in beams from the laser vaporizes selected portions of the metallized layer of the selected web, passes through the dielectric layer of the selected web and through the dielectric layer of the remaining web of said film to the metallized layer of the remaining web of said film, and vaporizes selected portions of the metallized layer of the remaining web of said film.

48. The apparatus of claim 46 wherein each laminate comprises a carrier tape with two opposite surfaces, the carrier tape constituting one of the webs of such laminate, wherein each winding means winds the second web from one such laminate and the first web from the other laminate into one such coil along with the carrier tape having the first web from the last-mentioned laminate adhering peelably thereto, and wherein the means for removing selected portions of the metallized layers of the webs of each laminate is arranged for applying optical energy in beams from a laser to the metallized layer of a selected one of the webs of said film along longitudinal lanes, in such manner that optical energy in beams from the laser vaporizes selected portions of the metallized layer of the selected web, passes through the dielectric layer of the selected web, through the carrier tape, and through the dielectric layer of the remaining web of said film, to the metallized layer of the remaining web, and vaporizes selected portions of the metallized layer of the remaining web of said film.

49. The apparatus of claim 45 wherein each coil has an axis and wherein the winding means are arranged for winding the webs into the respective coils in such manner that the first ribbons are offset axially from the second ribbons.

50. Apparatus for making capacitive structures comprising interleaved webs of metallized, dielectric film, each web having a metallized layer and an opposite, dielectric layer, from materials including a laminate comprising a carrier tape and a first web of said film adhering peelably to the carrier tape, the materials including a second web of said film, the apparatus comprising
   (a) means for placing the second web in such manner that the metallized layer of the second web faces in a given direction,
   (b) means for placing the second web onto the second web, along with the carrier tape having the first web adhering peelably thereto, in such manner that the metallized layer of the first web faces in the same radial direction, and
   (c) means for heat-tacking the first web to the second web, through the carrier tape.

51. The apparatus of claim 50 further comprising
   (d) means for peeling the carrier tape from the first web after the first web has been heat-tacked to the second web.

52. A laminate useful in making capacitive structures comprising webs of metallized, dielectric film, wherein each web has a metallized layer and an opposite, dielectric layer, the laminate comprising a carrier tape with two opposite surfaces, a first web of said film adhering peelably to the carrier tape, and a second web of said film adhering peelably to the carrier tape, said webs adhering respectively to the opposite surfaces of the carrier tape, wherein each web has a like number of narrow, longitudinal, demetallized lanes.

53. The laminate of claim 52 comprising a carrier tape with two opposite surfaces, a first web of said film, and a second web of said film, wherein each of the first and second webs adheres peelably to one of the opposite surfaces of the carrier tape.

54. The laminate of claim 53 wherein the first web adheres peelably to the carrier tape at the dielectric layer of the first web and the second web adheres peelably to the carrier tape at the dielectric layer of the second web.

55. The laminate of claim 54 wherein the dielectric layer of each web is a relatively thin layer of dielectric film and the carrier tape is a relatively thick tape of dielectric film.

56. The laminate of claim 55 wherein the dielectric layer of each web is a layer of poly(ethylene terephthalate) film having a thickness from about 0.2 $\mu$m to about 2.0 $\mu$m.

57. The laminate of claim 52 wherein the lanes are laser-scribed along the metallized layers of the first and second webs.

58. A laminate useful in making capacitive structures comprising webs of metallized, dielectric film, the laminate comprising two webs of said film, wherein each web has a like number of narrow, longitudinal demetallized lanes, each of said lanes of each web being located along an outer surface of said web in opposed relation to one of said lanes of the other web.

* * * * *